April 30, 1935.  G. S. BRITTEN  1,999,278
REMOTE CONTROLLED PHOTOGRAPHIC APPARATUS
Filed Sept. 22, 1933   2 Sheets-Sheet 1
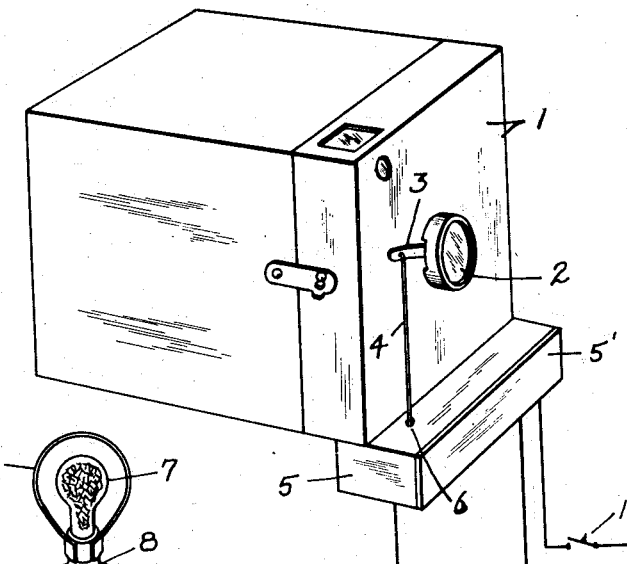
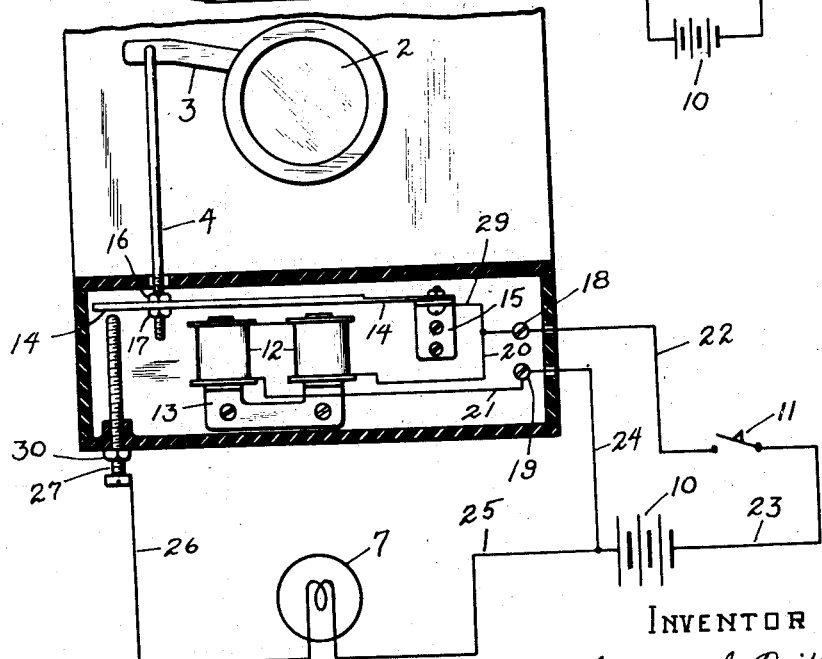
INVENTOR
George S. Britten
BY
Denison & Thompson
ATTORNEYS
WITNESS
J. T. Mains April 30, 1935.　　　　G. S. BRITTEN　　　　1,999,278
REMOTE CONTROLLED PHOTOGRAPHIC APPARATUS
Filed Sept. 22, 1933　　　2 Sheets-Sheet 2
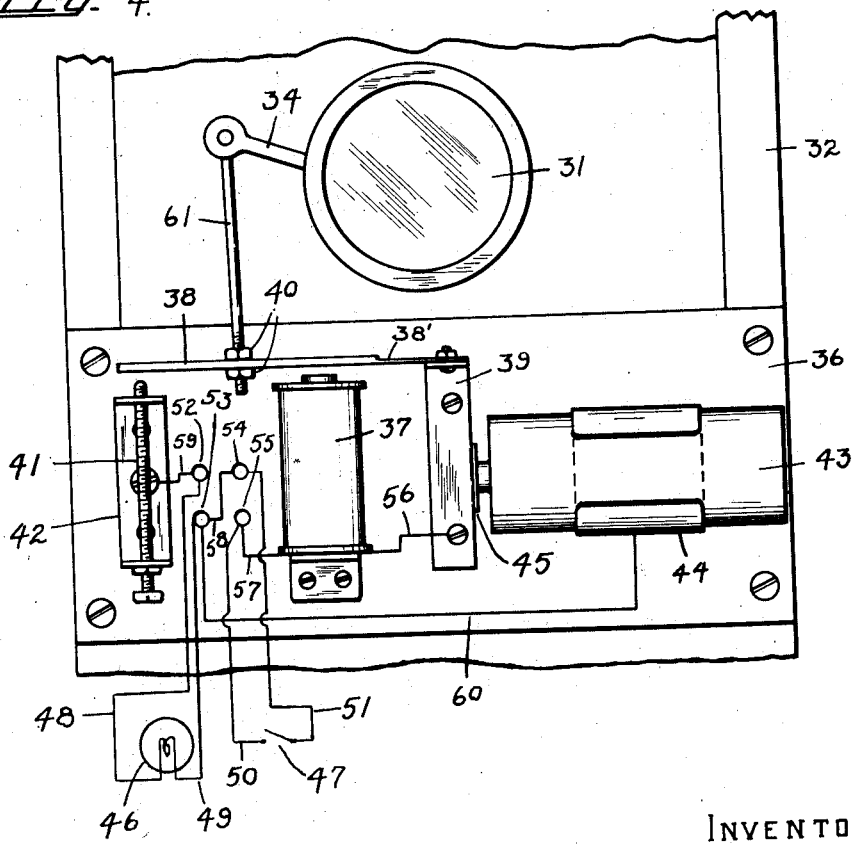

Patented Apr. 30, 1935

1,999,278

UNITED STATES PATENT OFFICE 1,999,278

REMOTE-CONTROLLED PHOTOGRAPHIC APPARATUS

George S. Britten, Syracuse, N. Y.

Application September 22, 1933, Serial No. 690,538

1 Claim. (Cl. 67—29)

This invention relates to new and useful improvements in remote-controlled photographic apparatus.

The main object of the invention is to provide an attachment for an ordinary still-picture camera that will permit an operator either from a point remote from the camera or with camera in hand or on a suitable support to make a close-up exposure of the subject being photographed.

A further object of the invention is a provision of a remote-controlled attachment for a camera for making flashlight exposures properly timed with the shutter operation of the camera by an operator either positioned at a considerable distance from the subject and camera, or with camera in hand or on a support when natural lighting conditions are insufficient for photography.

It is also an object of this invention to provide an attachment for a camera permitting living animals to actuate the control mechanism unbeknown to them for the purpose of making photographic exposures of these subjects either with or without flashlight depending upon the natural light conditions.

Other objects and advantages relate to details of the apparatus and the arrangement of the various parts thereof, all as will more fully appear from the following description taken in connection with the accompanying drawings in which:—

Figure 1 illustrates a camera with the remote-controlled apparatus of this invention applied thereto.

Figure 2 shows in diagrammatic form, details of the structure, including the control circuits.

Figure 3 illustrates a modified form of apparatus.

Figure 4 shows an enlarged fragmentary view of the apparatus of Figure 3.

In Figure 1, for the purpose of illustration, I have shown an ordinary box camera 1 having a lens 2, a shutter mounted in back of the lens, not shown, and a shutter-operating lever 3.

The other elements of the camera are not specifically illustrated since they are well known in the art and furthermore, are not directly involved in this invention.

Secured in any well known manner as by screws or clamps to the forward end of camera casing 1 is a rectangular casing 5 which may have a cover plate 5' and in which is located an electro-magnetically operated shutter-control mechanism. This mechanism is more clearly shown in Figure 2 and comprises an electro-magnet 12 here shown as two coils electrically connected in series and, in turn, connected to terminals 18 and 19 by wires 20 and 21 and mounted on a U-shaped core 13. It will, of course, be understood, that a single coil electro-magnet as shown in Figures 3 and 4 may be used when little energy is required to operate the shutter or when the space available for housing the mechanism is limited.

An armature 14 may be resiliently mounted at one end as shown at 14' on to bracket 15 and extend in approximate parallel relation across the pole pieces of core 13 as shown.

The other end of armature 14 is provided with an aperture for receiving a shutter-operating rod 4 which has its upper end pivotally secured in shutter-operating lever 3. In order to secure the proper coupling between lever 3 and armature 14, the lower end of rod 4 is threaded and provided with adjusting nut or nuts 16 and 17 as shown.

An electrical circuit for energizing coil or coils 12 is provided from terminal 18 through wire 22, switch 11, wire 23, battery 10 and wire 24 to terminal 19. It will be apparent that as switch 11 is closed, current will flow from battery 10, wire 24, terminal 19, wire 21, coils 12, wire 20, terminal 18, wire 22, switch 11, wire 23 back to the battery. As coils 12 are energized, armature 14 will be attracted downwardly, which movement actuates the shutter through means of connecting rod 4 and shutter-operating lever 3. Thus, an operator may set up switch 11 at some distance from the camera and subject, or at the camera and operate the shutter at will by closing the switch.

In addition to the function of actuating the camera shutter, electro-magnet 12 through means of armature 14 is adapted to function as a circuit closer for igniting photo-flash lamp 7 shown in Figure 1 supported by a socket 8 having a reflector 9. This feature makes it possible to photograph subjects in the dark as at night or in very densely shaded places during the daytime when the natural lighting is insufficient for photography.

The photo-flash lamp circuit starting with battery 10 consists of wire 25, lamp 7, wire 26, adjustable switch contact 27, armature 14, wire 29, terminal 18, wire 22, switch 11 and wire 23 back to battery 10. Upon closing switch 11, electromagnet 12 will be energized attracting armature 14 drawing down shutter lever 3 as previously described. At the same time, armature 14 approaches adjustable contact screw 27 and as soon as contact is made, closes the flash lamp circuit igniting the lamp.

Contact 27 is made in the form of a screw threaded through casing 5 and may be provided with a lock nut 30, so as to be adjustable making it possible to properly co-ordinate the flashing of the lamp with the opening of the shutter. By adjusting screw 27 up or down, it is evident that the opening of the shutter can be properly timed with the closing of the flash lamp circuit. The exposure in this instance can be timed in the usual manner by shutter adjustment.

In Figures 3 and 4, certain modifications are shown. For instance, it may be desirable to make the attachment more or less permanent on folding type cameras as shown in Figure 3 in which only such parts of the camera are illustrated as are believed necessary to lead to a clear understanding of the invention. In Figure 3, lens 31 and a suitable shutter mounted in back thereof but not shown is supported by framework 32 to which is also secured in the usual manner bellows 33.

34 represents the shutter-actuating lever. Frame 32 is supported at its lower portion by a telescopic slide 35 permitting the lens and shutter to be housed within a compact case in the usual well known manner. Upon the vertical members of frame 35 and positioned below the lens I provide a panel strip 36 of suitable material which may be secured to the framework by screws as shown or may be clamped thereto in any other suitable manner.

Upon panel 36 is mounted an electro-magnet 37 here shown having a single coil supported upon a suitable core. It is, of course, understood that if a single coil does not exhibit sufficient attractive effort, a double coil arrangement can be employed as shown in Figures 1 and 2. The single coil has the advantage of taking less space and may be more desirable for use with folding type cameras of comparatively small size.

An armature 38 is provided having a flexible portion 38' which may be resiliently secured to bracket 39 mounted on panel 36 as shown. Armature 38 extends in approximate parallel relation across the end of coil 37 and is provided with an aperture for receiving shutter-operating rod 61 pivotally secured to shutter-operating lever 34. The proper coupling between shutter-operating lever 34 and armature 38 in this instance, is obtained by nuts 40 threaded to the lower portion of rod 61 as shown.

The free end of armature 38 is also adapted to contact with an adjustable contact screw 41 supported as shown by a suitable bracket 42. In an endeavor to house as much as possible of the apparatus in the camera casing, so as to form a compact unitary article, I mount battery 43 for energizing electro-magnet 37 and igniting the flash lamp, upon panel 36 by means of a clamping member 44. In this instance, a small tubular flash light battery is shown in which the outer casing forms one of the terminals to which electrical contact can be made through clamp 44. The central terminal of battery 43 is adapted to contact with a spring contact member 45 which, in this instance, may be formed integrally with bracket 39.

Connection to flash lamp 46 and operating switch 47 may be made through wires 48, 49, 50 and 51 which, for convenience, may terminate in plug terminals adapted to be respectively plugged into socket terminals 52, 53, 54 and 55 mounted in panel 36.

The circuit for energizing electro-magnet 37 is as follows: Battery 43, terminal 45, bracket 39, wire 56, coil 37, wire 57, socket 55, wire 50, switch 47, wire 51, socket 54, wire 58, socket 53, wire 60 and back to battery 43 through clamping connection 44.

The flash lamp circuit comprises battery 43, contact 45, bracket 39, armature 38, contact screw 41, bracket 42, wire 59, socket 52, wire 48, flash lamp 46, wire 49, socket 53, wire 60, back to battery 43 through clamping connection 44.

The operation of the modified system is the same as that previously described in connection with Figures 1 and 2.

From the foregoing description it is apparent that the apparatus of this invention lends itself to the making of interesting and instructing photographic studies of a variety of subjects including birds and animals. With the remote-controlled circuit, the camera can be set up and focused upon an area within the natural surrounding of the subject being photographed even if it is in darkness or in a densely shaded area. The photo-flash lamp can be directed toward the area and simultaneously ignited with the actuation of the camera shutter by an operator from some advantageous remote position or with the camera in hand.

With the above described apparatus, it is even possible to bait switch lever 11 or 47 and place it in direct focus with the camera so that when the subject appears and attempts to devour the bait, the switch will be closed actuating the camera shutter and flashing the lamp.

It will also be apparent from the above description that the apparatus can be used without flashlight where the natural lighting conditions are sufficient for photography.

Although I have shown a specific arrangement of apparatus for the remote control of photographic apparatus, it is to be understood that the same was for the purpose of illustration and that many changes and modifications can be made by those skilled in the art without departing from the spirit and scope of the appended claim.

I claim:

In photographic apparatus, the combination with a folding camera having a casing, a shutter and a support for said shutter, said support being extensible for supporting said shutter in operative position exteriorly of said casing and retractable for housing the shutter and the support within the casing when not in use, of a panel mounted on said support and movable therewith adapted to be housed in said casing when not in use, an electro-magnet mounted on said panel having an armature whose movement is adapted to control the operation of said shutter, a contact member adjustably mounted on said panel, said contact member and said armature constituting a relay switch, a battery connected to said electro-magnet, a flash lamp remote from said panel, connections from said lamp releasable at said panel for connecting said lamp in circuit with said relay switch to said battery in parallel with said electro-magnet, a manually operable switch remote from said panel, connections from said manually operable switch releasable at said panel for connecting said switch in circuit with said electro-magnet, said manually operable switch being adapted to control the movement of said armature for simultaneously actuating said shutter and flashing said lamp.

GEORGE S. BRITTEN.